ANALOG FUNCTION GENERATION
Filed May 16, 1960
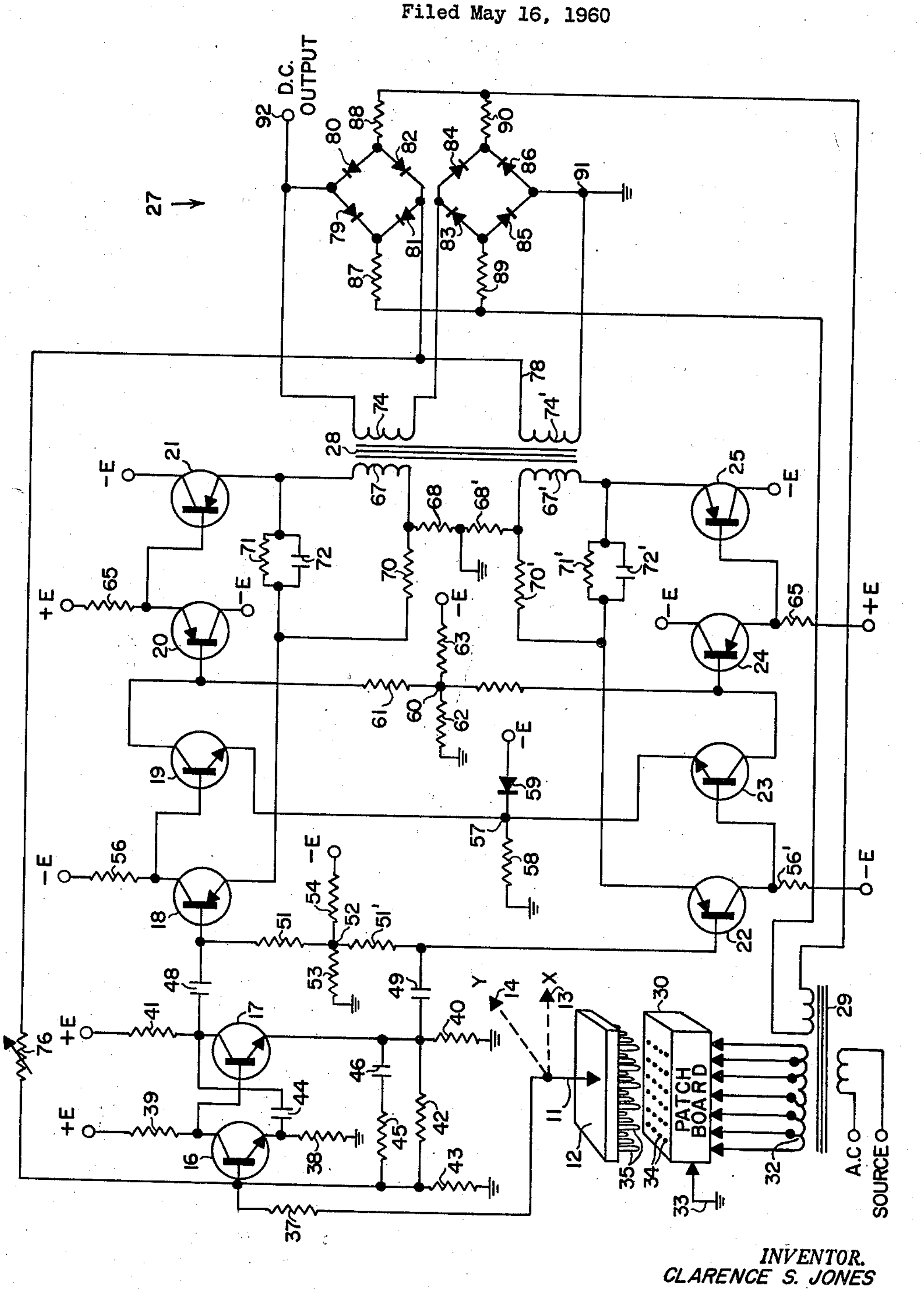
INVENTOR.
CLARENCE S. JONES
BY Edward A. Robinson
ATTORNEY 3,182,183

ANALOG FUNCTION GENERATION

Clarence S. Jones, Los Altos, Calif., assignor to General Precision, Inc., Binghamton, N.Y., a corporation of Delaware Filed May 16, 1960, Ser. No. 29,430
3 Claims. (Cl. 235—197)

This invention relates to analog computers, and more particularly to an analog method and means for generating signals representative of functions of plurality of quantities represented by input signals.

A co-pending application for United States Letters Patent, Serial No. 814,898, filed May 21, 1959, by Svein B. Rasmussen entitled "Apparatus and Method for Analog Function Generation" and assigned to the same assignee as the instant application discloses a means for generating an output quantity which is a pre-determined mathematical or empirical function of two input quantities by providing an electrically conductive resistance film combined with a servo drive for positioning a slider contact along X and Y axes on the film. The two-dimensional resistance film is provided with electrical contacts at a plurality of points in a matrix configuration, and appropriate voltages may be impressed thereon through a patchboard which is connected in accordance with any specific desired analog function. Thus, the surface of the film will present a two-dimensional voltage pattern, and the voltage sensed by the sliding contact will be determined by the X–Y positioning thereof. The two input quantities may be applied to the servo drive mechanisms mechanically coupled to the sliding contact and/or the film holder to move the contact in two dimensions with respect to the film to thereby pick-up a voltage corresponding to the analog function of the two input quantities.

It is an object of this invention to provide an improved analog function generation system wherein alternating voltages are applied to an electrically resistive film such that a slider may pick up an alternating wave having an amplitude and phase determined by the X–Y positioning thereof; it is a further object to provide an improved circuit for amplifying the alternating wave and for synchronously demodulating the wave to derive a direct voltage output corresponding in value and polarity to the desired function of the two input variables.

It is another object of this invention to provide an improved amplifying circuit for the analog function generating system; and more specifically it is an object to provide a transistorized amplifier which may have complementary branches for push-pull operation and wherein a first feedback circuit senses the current output and stabilizes the amplifier from D.-C. drift while a second feedback circuit improves the linearity of the alternating wave.

Numerous other objects and advantages will be apparent throughout the progress of the specification which follows. The accompanying drawing illustrates a certain selected embodiment of the invention.

The single figure of the drawing illustrates the circuit diagram of the amplifier of this invention including a schematic representation of the resistance film and the mechanism for positioning a slider in two dimensions thereon.

Briefly stated, according to a preferred embodiment of this invention, a pick-up device or slider 11 is moved across and positioned upon a film strip 12 in accordance with two analog input signals by servo mechanisms indicated schematically by arrows 13 and 14. An alternating voltage picked up by the slider 11 is amplified by a pre-amplifier circuit including transistors 16 and 17, and thence by a push-pull amplifier including transistors 18, 19, 20 and 21 of a first branch and including transistors 22, 23, 24 and 25 of a complementary branch. The output circuit of the push-pull amplifier is coupled to a synchronous demodulator 27 by a transformer 28. A power transformer 29 furnishes alternating voltages to matrix points of the resistance film 12 through connections in a patchboard 30, and also furnishes a synchronizing signal to the synchronous demodulator 27 from which a direct output voltage is derived.

As shown in the drawing, the power transformer 29 includes a secondary winding 32 which is tapped at various points to provide a plurality of alternating voltages coupled to the patchboard 30. A ground connection 33 is also provided to the patchboard 30 to permit a selective grounding of the secondary winding 32 at any of the tapped points. Jumper connections within the patchboard may be selectively arranged such that a desired voltage pattern may appear on terminal jacks 34 whereby an alternating voltage of a pre-selected amplitude and phase with respect to ground will appear on each of the jacks 34. Interconnecting jumpers may be provided such that certain of the jacks will be connected together to produce pre-selected equipotential curves on the two-dimensional geometric configuration of the array of jacks 34. As taught by the co-pending patent application, Serial No. 814,898, supra, the two-dimensional voltage pattern will appear upon the resistance film 12 when the units are plugged together with prongs 35 engaging the corresponding jacks 34. Different plug boards 30 may be wired to produce different desired two-dimensional voltage patterns such that the analog function may be changed by interchanging patchboards.

The resistance film 12 may be considered as a complex two-dimensional potentiometer wherein a sliding contact 11 is moved and positioned along two perpendicular axes by the servo motors 13 and 14 which constitute two input devices for receiving independent variable input quantities. The X and Y drives 13 and 14 are fully described in a co-pending application for United States Letters Patent, Serial No. 29,395 filed on an even date herewith by Clarence S. Jones and Svein B. Rasmussen entitled "Linear Servo Mechanism." The signal sensed and picked up by the sliding contact 11 is an alternating voltage synchronized with the alternating current source at the transformer 29, but variable in amplitude and reversible in phase. Thus, as the contact 11 moves across the surface 12, the sensed voltage wave may have an initial amplitude which decreases to zero and then increases in value but with reversed phase. This variation in the sensed voltage will correspond to the desired analog function.

The analog voltage sensed and picked up by the movable contact 11 is impressed upon the base electrode of the transistor 16 through a coupling resistor 37. The emitter electrode of the transistor 16 is grounded through a resistor 38, and the collector electrode is connected to a source of positive voltage by a load resistor 39. The base electrode of the transistor 17 is directly connected to receive signals from the collector electrode of the transistor 16. The emitter electrode of the transistor 17 is grounded through a load resistor 40, and the collector electrode is coupled to the source of positive voltage by an equal load resistor 41. The transistors 16 and 17 constitute a pre-amplifying circuit.

A resistor 42 provides a negative feedback path for direct current stabilization of the pre-amplifier stage, and is connected between the emitter electrode of the transistor 17 and the base electrode of the transistor 16 which is biased above ground by a resistor 43. A capacitor 44 is coupled between the collector electrode of the transistor 17 and the emitter electrode of the transistor 16 to provide an alternating current negative feedback.

A further negative feedback is provided by an RC circuit including a resistor 45 and a capacitor 46. The two alternating current feedback paths, the capacitor 44 and the RC circuit 45–46 provide an attenuation for high frequency currents, or a "roll-off characteristic" which will prevent oscillation in the pre-amplifier.

The pre-amplifier is coupled to the succeeding push-pull amplifier by capacitors 48 and 49 which pass the alternating currents in opposite phase to the base electrodes of the transistors 18 and 22. Since the two complementary branches of the push-pull amplifier are substantially identical in construction and function, a complete understanding may be gained by reference to the upper branch only. Circuit elements of the complementary lower branch of the push-pull amplifier have been provided with reference numerals corresponding to the designations of the elements in the upper branch but with prime marks.

A resistor 51 couples the base electrode of the transistor 18 to a point of negative bias 52 which is provided by a potential dividing network including a pair of resistors 53 and 54 connected in series between a source of negative voltage and a ground point. The collector electrode of the transistor 18 is coupled to a negative voltage source by a load resistor 56, and is directly connected to pass signals to the base electrode of the next succeeding transistor 19. The emitter electrode of the transistor 19 is coupled to a point of negative bias 57 provided by a series network including a resistor 58 and a Zener diode 59 coupled between the negative voltage and a point of ground potential. Similarly the collector electrode of the transistor 19 is coupled to a point of negative potential 60 by a load resistor 61. The negative potential at the point 60 is provided by a potential dividing network including two resistors 62 and 63 connected in series between the negative voltage source and ground.

The base electrode of the transistor 20 is directly connected to receive signals from the collector electrode of the transistor 19, and is connected as an emitter follower. The emitter electrode of the transistor 20 is coupled to the positive voltage source by a load resistor 65, and the collector electrode is directly connected to the source of negative voltage. In the final stage of the push-pull amplifier, the base electrode of the transistor 21 is directly connected to and receives signals from the emitter electrode of the transistor 20. The transistor 21 is likewise connected as an emitter follower with the collector electrode directly connected to the negative voltage source while the emitter electrode is coupled to ground through a winding 67 of the output transformer 28 and through a load resistor 68. The transistor 21 provides a low impedance output stage capable of passing a high output current to the winding 67.

In the upper branch of the push-pull amplifier the transistor 18 provides high gain voltage amplification with a high input impedance. The transistor 19 provides further amplification for the alternating wave with a phase inversion thereof. The transistor 20 provides a base current necessary to drive the final transistor 21 which constitutes a low impedance power output stage.

The resistor 68 may have a value of approximately 1 ohm, and will provide a voltage drop proportional to the current flow through the transformer winding 67. A resistor 70, coupled between the emitter electrode of the transistor 18 and the resistor 68, provides a first feedback circuit responsive to the output current flow from the transistor 21 through the winding 67. This feedback circuit serves to stabilize the amplifier by preventing a direct current drift.

A resistor 71 connected in parallel with a capacitor 72 provides a second feedback path between the emitter electrode of the transistor 21 and the emitter electrode of the transistor 18 for passing a signal voltage. The second feedback circuit 71 and 72 passes the alternating voltage of the input signal and functions to linearize the amplifier characteristics. Therefore, it may be appreciated that each branch of the push-pull amplifier is provided with feedback for (1) direct currents for stability and prevention of drift, and for (2) the alternating output voltage.

The output transformer 28 is provided with two primary windings 67 and 67′ which couple to the complementary branches of the push-pull amplifier and further provide secondary windings 74 and 74′. An over-all feedback circuit is provided by a resistor 76 coupled between the secondary winding 74′ of the output transformer and the base electrode of the transistor 16. This resistor may be variable to function as a gain control.

The output transformer as shown includes primary and secondary windings for each of the complementary branches of the push-pull amplifier, but since a single transformer is used with a single magnetic core, the output voltage at a point 78 is the resultant of currents from both of the output transistors 21 and 25. Therefore, the single feedback path 76 functions as an over-all feedback for the entire amplifying system including both branches of the push-pull amplifier.

The synchronous detecting circuit 27 includes two bridge networks and eight diodes 79 through 86. An alternating voltage from a tertiary winding of the power transformer 29 is applied to opposite sides of the double bridge circuit through current limiting resistors 87 through 90. During a first half cycle of an alternating wave, current may pass through the upper bridge circuit via a path through the resistor 88, dividing between the two branches of the bridge including the diodes 79–80 and 81–82, and thence returning through the resistor 87. During the next subsequent half cycle of the wave the upper bridge circuit will be non-conductive, but current will flow through the lower circuit via the resistor 89, dividing between the upper diodes 83–84 and the lower diodes 85–86, and thence returning through the resistor 90 to the transformer 29. If no signal appears at the output transformer 28, the double bridge circuit will be balanced and no net current will flow between the grounded point 91 and the direct current output terminal 92. On the other hand, if an alternating current signal is passed from the output transformer 28, a proportional direct voltage output will appear at the terminal 92. The polarity of the output signal at terminal 92 will depend upon the relative phase between the alternating currents passed by the amplifying system and the transformer 28 and by the tertiary winding of the power transformer 29. Obviously since both alternating currents were initially derived from the same alternating current source represented by the power transformer 29, the two waves will be synchronized with each other and any phase reversal of the analog signal which may result from a movement of the sliding contact 11 from one side to the other of a ground potential line appearing on the reistance film 12, will cause a reversal in the polarity of the output signal at the terminal 92. A full description of the synchronous demodulating arrangement 27 may be found in an article entitled "Servo Modulators" by B. T. Barber, published in the October 1957 issue of Control Engineering, McGraw-Hill Publishing Company; and specific reference is made to FIGURE 15, page 103.

The amplifying system of this invention provides transistorized circuits with means for feeding back signals representative of output voltages and direct currents. An amplifier which was built in accordance with this invention has proved to be very stable and has provided a reliable output over a long life with a minimum deterioration due to aging of components.

The use of alternating current function signals which may be amplified and synchronously detected or demodulated provides a highly efficient system since no energy is wasted by unused turns of the transformer secondary winding 32. For example, if we were to assume that the ground connection 33 and the movable contact 11 were coupled to adjacent taps of the winding 32, then substantially the entire energy input from the magnetic core to that winding 32 would appear as a useful output from the small portion of the winding between the adjacent taps actually used. This is in marked contrast with a direct current system which may use a potential dividing resistor with multiple taps similar to the taps of the winding 32. In the case of the resistor, substantial energy would be consumed along its full length, and when a useful voltage is picked off from a small segment thereof, the ratio of useful energy consumed to the total energy input would be very low.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. Apparatus for generating a direct voltage output signal representative of an analog function, said apparatus comprising a source of alternating current, an impedance device coupled to the source of alternating current for establishing a geometric pattern wherein alternating signals vary in magnitude according to the analog function, a voltage pick-up device movable in the geometric pattern and operable to receive the alternating signal corresponding in amplitude to the analog function and to the positioning of the pick-up device, an amplifier coupled to the pick-up device for developing an alternating output signal, and a synchronous demodulator circuit coupled to the amplifier and to the source of alternating current, said amplifier comprising at least one transistor coupled to the pick-up device and constituting a stage of pre-amplification, said amplifier further including additional transistors arranged in two branches for push-pull amplification and coupled between the stage of pre-amplification and the synchronous demodulator, a final transistor of each branch being a current output stage, a first negative feedback path coupled to the current output stage and capable of passing direct currents, said first negative feedback paths being sensitive to the output currents and being operable to stabilize the amplifier from direct current drift, each branch of the amplifier having another feedback path coupled to the output stage and operable to linearize alternating currents appearing in the output circuit.

2. The apparatus in accordance with claim 1 further comprising a transformer coupled between the current output stage and the synchronous demodulator circuit, and a further feedback path coupled between the transformer and the stage of pre-amplification, said transformer being operable to pass current from both branches of the push-pull amplifier to the synchronous demodulator circuit and being further operable to provide a mutual coupling between both branches of the push-pull amplifier and the feedback path.

3. The apparatus in accordance with claim 2 wherein the synchronous demodulator circuit includes two diode bridge circuits both coupled to the source of alternating current, and wherein the transformer includes two separate secondary windings each connected to a respective one of the diode bridge circuits whereby an output wave from the transformer unbalances the bridge circuits to provide a direct potential output signal corresponding in polarity to the phase of the output wave.

References Cited by the Examiner

UNITED STATES PATENTS

| | | | |
|---|---|---|---|
| 2,581,124 | 1/52 | Moe | 235—197 |
| 2,665,066 | 1/54 | Hornfeck | 235—193 |
| 2,680,177 | 6/54 | Rosenthal | 338—89 |
| 2,817,831 | 12/57 | Johnson et al. | 343—7.3 XR |
| 2,860,193 | 11/58 | Lindsay. | |
| 2,863,008 | 12/58 | Keonjian. | |
| 2,919,857 | 1/60 | Bonnell | 235—193 |
| 2,938,185 | 5/60 | Dill | 338—89 |
| 3,047,810 | 7/62 | Tvedt | 328—134 |

OTHER REFERENCES

Riddle & Ristenbatt: Transistor Physics and Circuits, Prentice Hall, pp. 288–291.

MALCOLM A. MORRISON, *Primary Examiner.*

C. D. ANGEL, WALTER W. BURNS, Jr., *Examiners.*